(12) United States Patent
Floyd et al.

(10) Patent No.: US 7,386,291 B2
(45) Date of Patent: Jun. 10, 2008

(54) INTEGRATED MILLIMETER-WAVE QUADRATURE GENERATOR

(75) Inventors: Brian Allan Floyd, Cortlandt Manor, NY (US); Ullrich Richard Pfeiffer, Carmel, NY (US); Scott Kevin Reynolds, Granite Springs, NY (US); Thomas Martin Zwick, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 10/653,539

(22) Filed: Sep. 2, 2003

(65) Prior Publication Data

US 2005/0048943 A1   Mar. 3, 2005

(51) Int. Cl.
*H04B 1/10* (2006.01)
(52) U.S. Cl. .............. 455/313; 455/323; 455/324; 455/314; 455/315; 455/205
(58) Field of Classification Search ........... 455/313, 455/323, 324, 314, 205
See application file for complete search history.

(56) References Cited

U.S. PATENT DOCUMENTS

| 4,742,530 | A | * | 5/1988 | Kawai | 375/214 |
|---|---|---|---|---|---|
| 4,751,549 | A | * | 6/1988 | Koizumi | 399/178 |
| 4,947,144 | A | * | 8/1990 | Le Nohaic | 333/128 |
| 5,132,645 | A | * | 7/1992 | Mayer | 333/109 |
| 5,749,051 | A | * | 5/1998 | Dent | 455/324 |
| 6,223,021 | B1 | * | 4/2001 | Silvia et al. | 455/77 |
| 6,275,105 | B1 | * | 8/2001 | Ghannouchi et al. | 330/151 |
| 6,559,899 | B1 | * | 5/2003 | Suzuki et al. | 348/731 |
| 6,714,775 | B1 | * | 3/2004 | Miller | 455/296 |
| 6,823,181 | B1 | * | 11/2004 | Kohno et al. | 455/324 |
| 6,850,750 | B2 | * | 2/2005 | Takaki et al. | 455/324 |

* cited by examiner

*Primary Examiner*—Nay Maung
*Assistant Examiner*—Richard Chan
(74) *Attorney, Agent, or Firm*—Stephen C. Kaufman (57) ABSTRACT

An off-chip signal is provided to a differential branch-line directional coupler implemented entirely on-chip. The coupler produces differential quadrature signals, which are then buffered and applied to a quadrature mixer. The coupler is implemented entirely on-chip using microstrip transmission lines. The coupler is made up of a plurality of rings and a plurality of underpasses connecting ports of the rings, wherein each of the plurality of rings is made up of four branch lines, and each branch line having an electrical length of one-quarter wavelength at the center design frequency. Coupling between the plurality of branch lines of the rings may be varied.

11 Claims, 6 Drawing Sheets

INTEGRATED MILLIMETER-WAVE QUADRATURE GENERATOR

FIELD OF THE INVENTION

The present invention relates generally to on-chip oscillator signals, and, more specifically, to producing quadrature signals on-chip using a differential coupler.

BACKGROUND

With recent progress in the semiconductor technology and packaging engineering, more portable personal communication systems are made available, as the dimensions of these circuits become smaller and the transmission lines are being formed with shorter distances from each other.

In frequency conversion systems, such as millimeter-wave radios, for example, discrete semiconductor components with low integration levels are assembled. These systems are often assembled using expensive and bulky waveguides and package-level or board-level microstrip structures to interconnect semiconductors.

Power couplers are used widely in frequency conversion systems such as the millimeter radios to divide power in an input path into two or more paths. In these millimeter radios, the power couplers used may include microstrip branch lines of different lengths to generate on-chip oscillator signals of different phases. For the purpose of shifting the phase by 90°, for example, quarter wave-length transmission lines may be used. As the dimension of the power coupler is reduced, the distances between the branch lines are also reduced. A known power coupler is the branch-line directional coupler.

Figure 1:
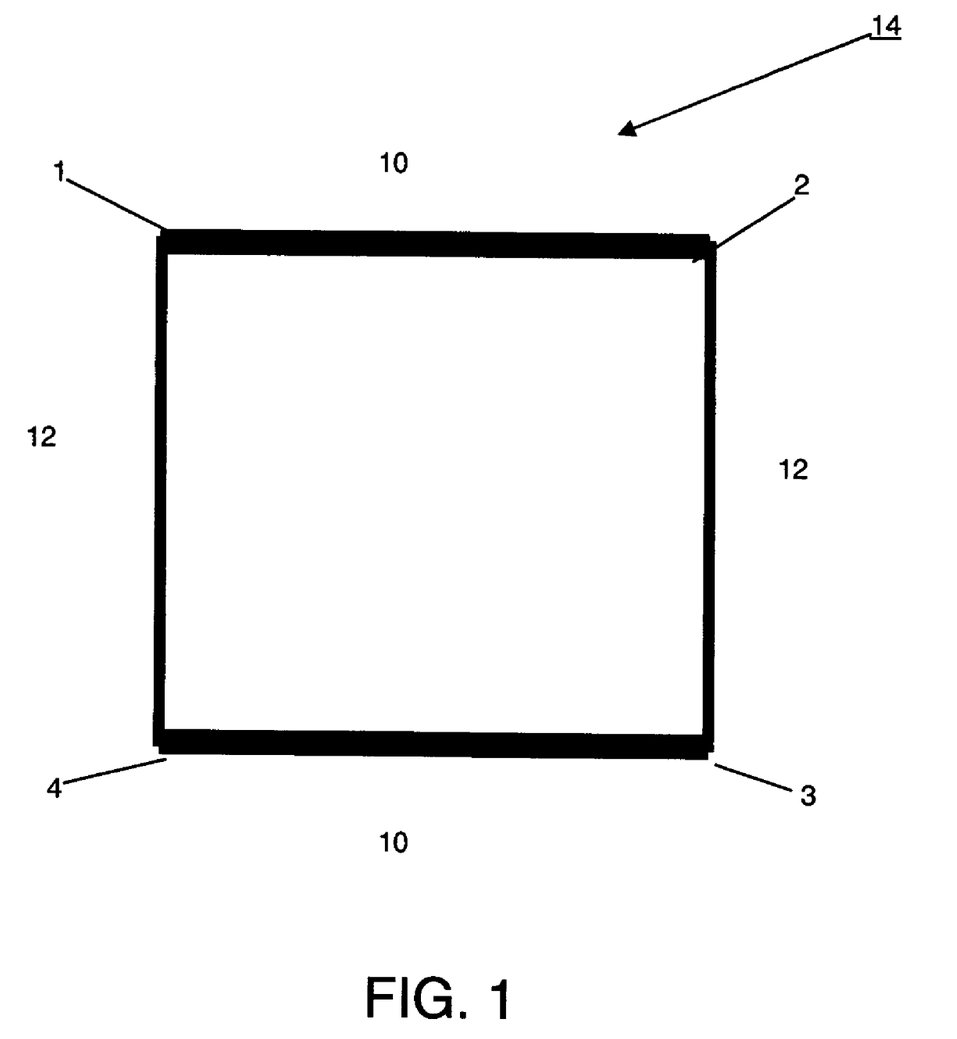
FIG. 1 shows an exemplary well-known coupler.

Shown in FIG. 1 is an exemplary branch-line directional coupler 14 with four branch lines 10, 12. As shown in FIG. 1, the branch lines 10, 12 are a quarter-wavelength long at the center design frequency, connected at connecting ports 1-4. Branch lines 10 connecting ports 1 and 2, and ports 3 and 4, have a characteristic impedance of Zo/1.414. Branch lines 12 connecting ports 2 and 3, and ports 1 and 4, have a characteristic impedance of Zo. When port 1 is driven by a signal, the voltage at port 3 lags the voltage at port 2 by 90°, and the voltage at port 4 is at a null (i.e. no output).

SUMMARY OF THE INVENTION

In accordance with the exemplary aspects of this invention, a frequency conversion system is provided.

In the exemplary aspects of this invention, an off-chip signal is provided to a frequency conversion system. The off-chip signal is then applied to a differential coupler implemented entirely on-chip. The coupler produces differential quadrature signals, which are then buffered and applied to a quadrature mixer.

In the exemplary aspects of this invention, the coupler is a differential branch-line directional coupler implemented entirely on-chip using microstrip transmission lines.

In the exemplary aspects of this invention, the coupler is made up of a plurality of rings and a plurality of underpasses connecting ports of the rings. In these exemplary aspects, each of the plurality of rings is made up of a plurality of branch lines of varying length and characteristic impedance, and an underpass.

In various exemplary aspects of this invention, each of the plurality of rings is made up of four branch, each branch line having an electrical length of one-quarter wavelength at the center design frequency.

In various exemplary aspects of this invention, coupling between the plurality of branch lines of the rings is varied.

In accordance with the exemplary aspects of the present invention, the frequency conversion system is a direct-conversion downconverting receiver.

In accordance with other exemplary aspects of the present invention, the frequency conversion system is a direct-conversion upconverting transmitter.

According to the exemplary aspects of this invention, a completely integrated quadrature generator at millimeter-wave frequencies is achieved, without taking the signals off-chip to a branch-line directional coupler fabricated on a circuit board or ceramic substrate. In these exemplary aspects, the quadrature generation is completed entirely on-chip. Accordingly, advantages such as reduction in cost and less power usage may be accomplished, since sending signals off-chip at high frequencies which typically requires buffer amplifiers to compensate for package and board loss may be avoided.

One exemplary aspect of this invention is to implement a millimeter-wave radio entirely on a silicon integrated circuit, while producing accurate quadrature, that is, 0° and 90° phase shifted, local oscillator signals on-chip, starting with a differential pair of lower-frequency pilot signals.

DETAILED DESCRIPTION OF THE INVENTION

The following description details how exemplary aspects of the present invention are employed. Throughout the description of the invention, reference is made to FIGS. 2-6. When referring to the figures, like structures and elements shown throughout are indicated with like reference numerals.

Figure 2:
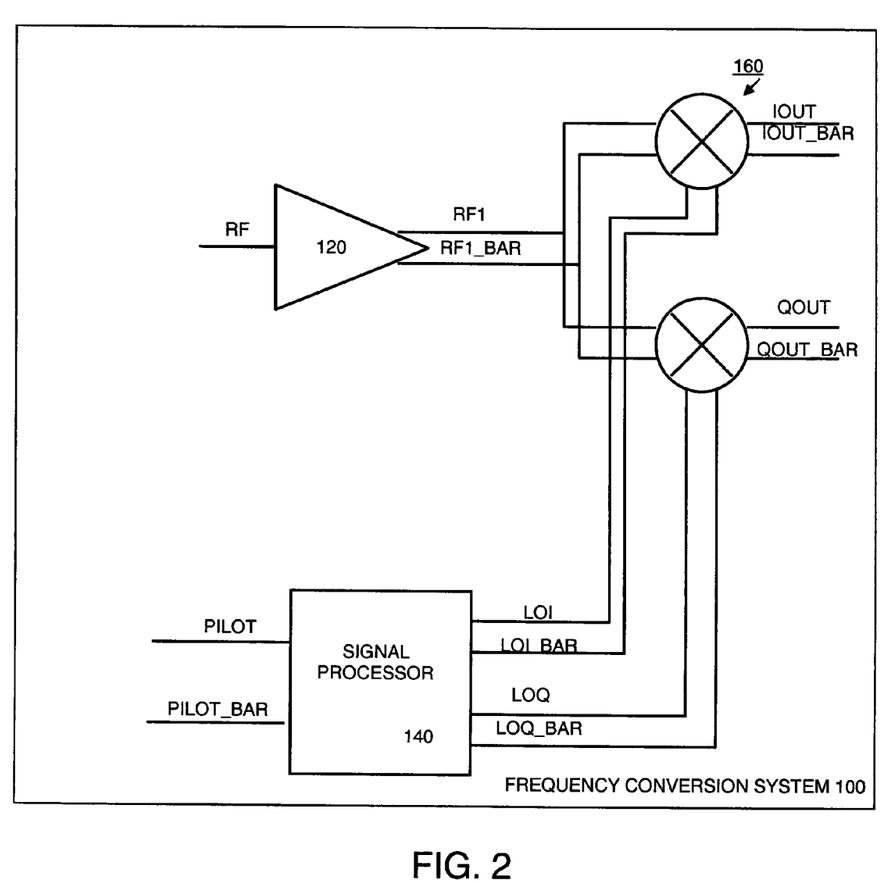
FIG. 2 shows an exemplary frequency conversion system embodying the exemplary aspects of the present invention.

In FIG. 2, an exemplary frequency conversion system 100 embodying the exemplary aspects of the present invention is shown. In an exemplary embodiment, the frequency conversion system 100 in FIG. 2 is a direct-conversion downconverter in which a radio frequency signal RF is applied to the amplifier 120.

It is initially noted that the frequency conversion system 100 of FIG. 2 is presented for illustration purposes only, and is representative of countless configurations in which the exemplary aspects of the present invention may be implemented. Thus, the present invention should not be considered limited to the system configuration shown in the figure.

For example, it should be appreciated that though the exemplary embodiment above describes the frequency conversion system 100 as a direct-conversion downconverter receiver, the frequency conversion system 100 may also be a direct-conversion upconverting transmitter. That is, the frequency conversion system 100 may be any system known in the art for converting a frequency of a pilot signal. Thus, it is contemplated that the frequency conversion system 100 may be configured and may include various topologies and protocols known to those skilled in the art.

As shown in FIG. 2, the frequency conversion system 100 includes an amplifier 120, a signal processor 140 and a quadrature mixer 160.

In operation, the signal processor 140 receives pilot signals, PILOT and PILOT_BAR from a frequency synthesizer. It should be appreciated that the synthesizer may be located on the same chip as the frequency conversion system 100 or on another chip. The pilot signals PILOT and PILOT_BAR are at a frequency equal to or proportional to the frequency of the desired quadrature local oscillator signals to be output from the signal processor.

It should be appreciated that though the exemplary embodiment shown in FIG. 2 shows that the pilot signal is a differential pair PILOT and PILOT_BAR, the various exemplary aspects of the present invention are not limited to the use of differential pilot signals.

In the exemplary embodiment shown in FIG. 2, the signal processor 140 amplifies the differential pair of pilot signals, PILOT and PILOT_BAR, converts the frequency of the pilot signals PILOT and PILOT_BAR to the desired local-oscillator frequency, if needed, by multiplication or division, and generates the quadrature local oscillator signals, LOI and LOI_BAR, and LOQ and LOQ_BAR, where LOI and LOI_BAR are the differential pair of in-phase local oscillator signals at 0°, and LOQ and LOQ_BAR are the differential pair of quadrature local oscillator signals at 90°.

The differential pairs of local oscillator signals, LOI and LOI_BAR, and LOQ and LOQ_BAR are then input to the quadrature mixer 160.

As shown in FIG. 2, the amplifier 120 receives and amplifies a radio frequency signal RF and converts the radio frequency signal RF to a differential pair of amplified radio frequency signals RF1 and RF1_BAR. It should be appreciated that the radio frequency signal RF may be received with the radio from any source known in the art. For example, the radio frequency signal RF may come directly from an antenna, or may come from a previous amplifier which amplifies the antenna signal prior to applying the signal to the amplifier 120. Accordingly, the source from which the radio frequency signal RF is received is not limited in the exemplary aspects of this invention.

The differential pair of amplified radio frequency signals RF1 and RF1_BAR are then input to the quadrature mixer 160.

It should be appreciated that though the exemplary embodiment shown in FIG. 2 shows that the RF signal is converted to a differential pair RF1 and RF1_BAR, the various exemplary aspects of the present invention are not limited to the use of differential RF signals. Accordingly, it should be appreciated that in various aspects of the present invention, the RF signal does not have to be converted to a differential pair RF1 and RF1_BAR.

As shown in FIG. 2, the quadrature mixer 160 mixes the differential pairs of local oscillator signals, LOI and LOI_BAR, and LOQ and LOQ_BAR and the differential pair of amplified radio frequency signals RF1 and RF1_BAR. In particular, the quadrature mixer 160 converts the frequency of the incoming radio frequency signals RF1 and RF1_BAR to a different frequency for amplification and detection. For example, the quadrature mixer 160 may convert the radio frequency signals RF1 and RF1_BAR to an intermediate frequency, or in the case of the frequency conversion system being a direct-conversion downconverting receiver, the quadrature mixer 160 may convert the radio frequency signals RF1 and RF1_BAR directly to baseband, that is, to frequency components centered about DC (or zero frequency).

The quadrature mixer 160 then generates the mixed differential pairs of output signals Iout and Iout_BAR and Qout and Qout_BAR. The signals Iout, Iout_BAR, Qout, and Qout_BAR are baseband signals which are further amplified and then detected.

In various embodiments, following amplification, the signals Iout, Iout_BAR, Qout, and Qout_BAR are converted to digital form by an analog-to-digital converter (not shown) prior to being detected in a digital baseband processor (not shown). The detection process extracts the desired information from the received RF signal.

In an exemplary embodiment, the quadrature mixer 160 is a double-balanced mixer, and the differential radio frequency signal pair RF1 and RF1_BAR output of the amplifier 120 is applied to the radio frequency inputs of the double-balanced mixer 160. In this exemplary embodiment, the local oscillator inputs of the quadrature mixer 160 are driven from the differential pairs of local oscillator signals LOI and LOI_BAR, and LOQ and LOQ_BAR output from the signal processor 140.

It should be appreciated that in a frequency conversion system 100, it is essential that leakage from the local oscillator and the radio frequency signals be minimized, because any local oscillator signal which leaks to the radio frequency input of the frequency conversion system 100 will be detected as a radio frequency signal, which may jam the frequency conversion system 100, overloading amplifier stages in the radio frequency signal path and generating time varying DC offsets at the outputs of the mixer 160. In accordance with the various exemplary embodiments of this invention, in the frequency conversion system 100, the leakage is minimized by bringing a pilot signal on-chip at a different frequency than the frequency of the local oscillator signal.

Figure 3:
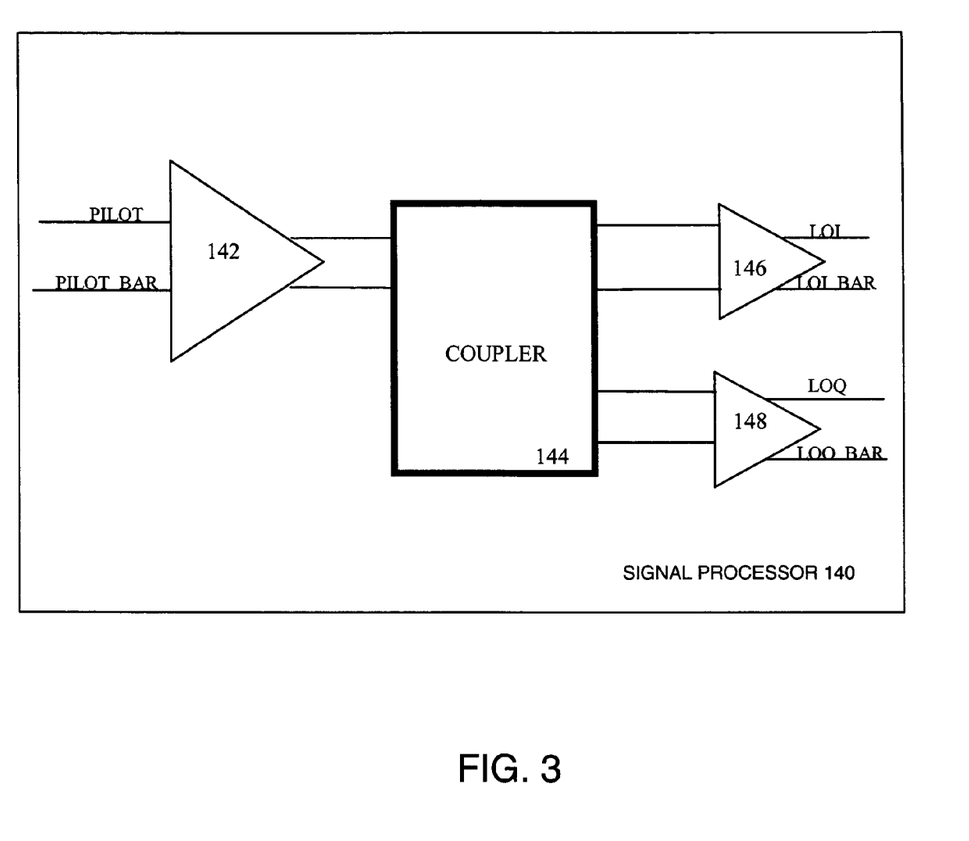
FIG. 3 shows an exemplary signal processor embodying the exemplary aspects of the present invention.

FIG. 3 shows an exemplary signal processor embodying the exemplary aspects of the present invention. As shown in FIG. 3, the signal processor 140 includes a frequency multiplier/divider 142, a coupler 144 and a pair of buffers 146 and 148.

As shown in FIG. 3, the differential pair of pilot signals PILOT and PILOT_BAR is applied to the input of the frequency multiplier/divider 142. The differential output LO and LO_BAR of the frequency multiplier/divider 142 is applied to the coupler 144. The coupler 144 receives the differential signals LO and LO_BAR, and splits the incoming signals LO and LO_BAR into quadrature versions, that is, versions which are 90° out-of-phase but otherwise the same LOI and LOI_BAR, and LOQ and LOQ_BAR. This is accomplished because the output signals, in-phase LOI and LOI_BAR and quadrature LOQ and LOQ_BAR, experience differing amounts of phase delay as they travel around the coupler 144.

As shown in FIG. 3, the differential pair of in-phase local oscillator signals at 0°, LOI and LOI_BAR, are output to the buffer amplifier 146, and the differential pair of quadrature local oscillator signals at 90°, LOQ and LOQ_BAR, are output to the buffer amplifier 148. The differential buffered amplifier outputs, LOI and LOI_BAR and LOQ and LOQ_BAR, from the buffer amplifiers 146 and 148, respectively, are output to be applied to the mixer LO inputs of the mixer 160, as shown in FIG. 2.

It should be appreciated that though FIG. 3 shows that the signal processor 140 includes buffer amplifiers 146, 148, the buffer amplifiers may be omitted and the signal processor 140 would still function as a quadrature generator by controlling the termination impedance with the mixer 160. For example, if the mixer 160 presents a resistive input impedance of the correct value to the terminate ports of the coupler 144, the buffers 146, 148 may be omitted. That is, because the buffers 146, 148 are provided to present the correct value of resistive termination to the coupler 144 so that the coupler 144 will function properly, if the mixer 160 already provides the correct resistive termination, the buffers 146, 148 are not needed.

Similarly, it should be appreciated that though FIG. 3 shows that the signal processor 140 includes a frequency multiplier/divider 142, the frequency multiplier/divider may be omitted and the signal processor 140 would still function as a quadrature generator by controlling the termination impedance with the buffers 146, 148 or with the mixer 160. That is, the quadrature generating function of the coupler 144 does not depend on the presence of the frequency multiplier/divider 142. Thus, if the frequency of pilot signals PILOT and PILOT_BAR is the same as the frequency of LO and LO_BAR, a frequency multiply/divide function is not needed.

In an exemplary embodiment of the present invention, the signal processor 140 is a frequency tripler and quadrature generator. In accordance with this exemplary embodiment, the frequency multiplier/divider 142 may be a frequency tripler that produces a differential local oscillator signal from an off-chip pilot signal by tripling the frequency of the pilot signal.

In this exemplary embodiment, the pilot signals PILOT and PILOT_BAR shown in FIG. 3 are at a frequency exactly one-third of the desired local-oscillator signals. The signal processor 140 amplifies the pilot signals PILOT and PILOT-_BAR by tripling the frequency of the pilot signals PILOT and PILOT_BAR to the desired local-oscillator LO frequency, and produces quadrature output signals.

In accordance with the various aspects of the present invention, advantages such as a completely integrated quadrature generator at millimeter-wave frequencies, with no off-chip millimeter-wave signals in the quadrature generator block may be achieved.

In various exemplary embodiments of the present invention, the coupler 144 of signal processor 140 is a differential branch-line directional coupler. In accordance with these exemplary embodiments, the differential signals LO and LO-BAR are applied to the differential branch-line directional coupler 140 implemented entirely on-chip using, for example, microstrip transmission lines. The differential branch-line directional coupler 140 produces differential quadrature LO signals, LOI and LOI_BAR, and LOQ and LOQ_BAR, which are then buffered and applied to the quadrature mixer 160 operating in quadrature.

The operation of the branch-line directional coupler 144 of the of signal processor 140 is generally similar to the coupler 14 of FIG. 1. However, there are several differences between this branch-line coupler 144 and the coupler 14 of FIG. 1. For example, in this branch-line directional coupler 144, the ports are driven and terminated differentially.

Further, in the branch-line directional coupler 144, the effect of coupling between adjacent transmission lines comprising the two differential halves are considered. For example, reduction in the characteristic impedance of the transmission lines making up the coupler 144, and thus reduction in the overall impedance of the coupler 144, is considered.

Figure 4:
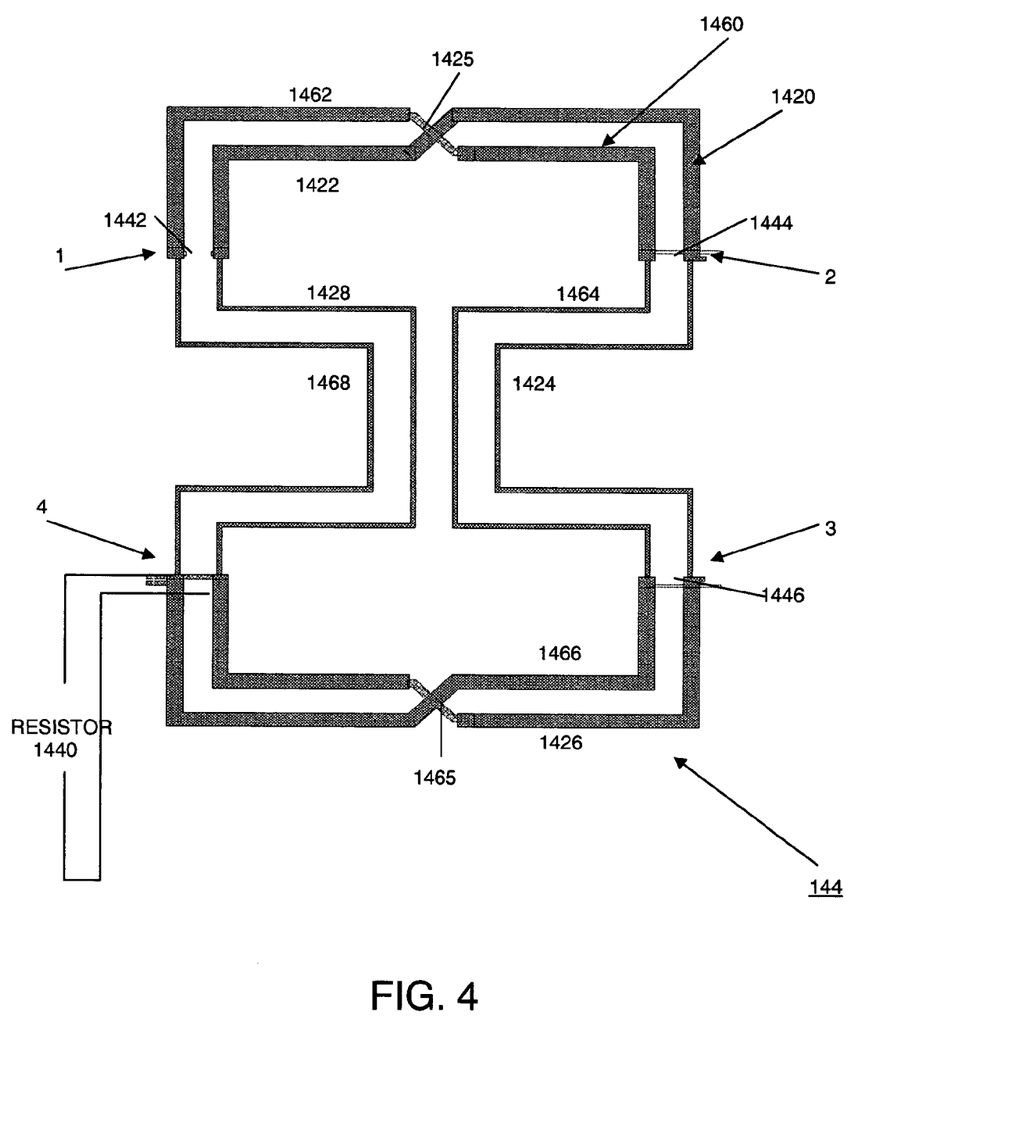
FIG. 4 shows an exemplary coupler in accordance with the exemplary aspects of the present invention.

FIG. 4 shows an exemplary coupler in accordance with the exemplary aspects of the present invention. As shown in FIG. 4, the coupler 144 comprises two top wiring levels including a first wiring level that forms microstrip transmission lines 1422-1428 and 1462-1468 connecting the four ports 1-4, and a second wiring level that forms underpasses 1425, 1465 and 1442-1446. As shown in FIG. 4, the two wiring levels form two complete rings 1420 and 1460, with the first ring 1420 having four branches 1422-1428 and underpass 1425, and the second ring 1460 having four branches 1462-1468 and underpass 1465. Underpasses 1442-1446 are also are provided at ports 1-3 where differential signals are applied to or taken from the coupler 144. In accordance with the exemplary aspects of the present invention, each of the four branches 1422-1428 and 1462-1468 has a total electrical length of one-quarter wavelength long at the center design frequency.

It should be appreciated that though FIG. 4 shows only the top two wiring levels that make up the two differential halves of the coupler 144, the coupler 144 may comprise other wiring levels used to form a ground plane under the entire structure or most of the structure. In the various exemplary aspects of the present invention, the characteristic impedance of the transmission lines 1422-1428 and 1462-1468 may be controlled by the width of the two wiring levels and the vertical spacing between the two wiring levels and the ground plane underneath. In these various exemplary aspects, the characteristic impedance in the coupler 144 may also be controlled by the horizontal spacing between the two wiring levels of the coupler 144.

As shown in FIG. 4, in an exemplary embodiment, port 4 does not include an underpass, but instead, a terminating resistor 1440 may be placed between the two transmission lines. That is, though no output signal is derived from port 4, to obtain the correct resistive termination in order for the coupler to function best as a quadrature generator, termination resistor 1440 is used.

It should be appreciated that though FIG. 4 shows that the termination resistor 1440 is placed between two transmission lines, this placement is merely for convenience in implementation, and that the physical location of the termination resistor 1440 according to the various aspects of this invention should not be limited to such placement.

In operation, in this exemplary embodiment, the differential local oscillator signals LO and LO_BAR output from the frequency multiplier/divider 142 is applied to port 1 of the coupler 144. The local oscillator signal power applied to port 1 is split evenly between ports 2 and 3, and the local oscillator phase is shifted by 90° to port 2 and by 180° to port 3. The quadrature local oscillator signals LOI and LOI_BAR and LOQ and LOQ_BAR from ports 2 and 3 are applied to buffer amplifiers 146 and 148 which include differential terminating resistors (not shown) at the inputs in order to properly terminate the coupler 144. Port 4 of the coupler 144 is also terminated via a terminating resistor 1440. In an exemplary embodiment, the differential terminating resistors are located between the two differential halves of the coupler 144, although they are electrically the differential input resistors of buffer amplifiers 146, 148.

The operation of the coupler 144 depends on the selection of the termination resistor values of the terminating resistor 1440 and the terminating resistors of buffer amplifiers 146 and 148. That is, in the various exemplary embodiments, the particular characteristic impedance of the coupler 144 is determined by the characteristic impedance of the transmission lines 1422-1428 and 1462-1468 that make up the coupler 144. To produce a phase difference between in-phase and quadrature ports 1-3 of exactly 90° at the center design frequency, the ports 1-4 should be terminated in twice the characteristic impedance of the coupler 144. If a phase difference slightly different than 90° may be tolerated, then the operating frequency range may be extended by terminating the ports 1-4 with somewhat higher termination resistance values.

It should be appreciated that, as discussed above, the buffer amplifiers 146 and 148 may be omitted and the signal processor 140 would still function as a quadrature generator by controlling the termination impedance with the mixer 160.

As discussed above, the coupler in accordance with the various exemplary embodiments of this invention is fully integrated on a silicon integrated circuit, and is a differential circuit. In these embodiments, the different degrees of coupling between the two differential halves of the coupler provide an additional design parameter for the coupler.

Although FIG. 4 shows a particular form of coupler with folded microstrip transmission lines, it should be understood that other layouts are possible, such as the conventional rectangular layouts, or the complex serpentine layout. It should be appreciated that, in FIG. 4, the transmission lines have been folded to make the coupler smaller, and that the various aspects of the invention are not limited to such folded layout.

In accordance with the various aspects of the present invention, the differential branch-line directional coupler could also be constructed with other forms of transmission lines, such as striplines or coaxial lines.

Although FIG. 4 depicts a differential branch-line directional coupler with only moderate coupling between the two differential halves because of the particular spacing between the transmission lines which make up the differential halves, it should be understood that layouts with either tighter or looser coupling may also be applied in the various aspects of the invention.

Figure 5:
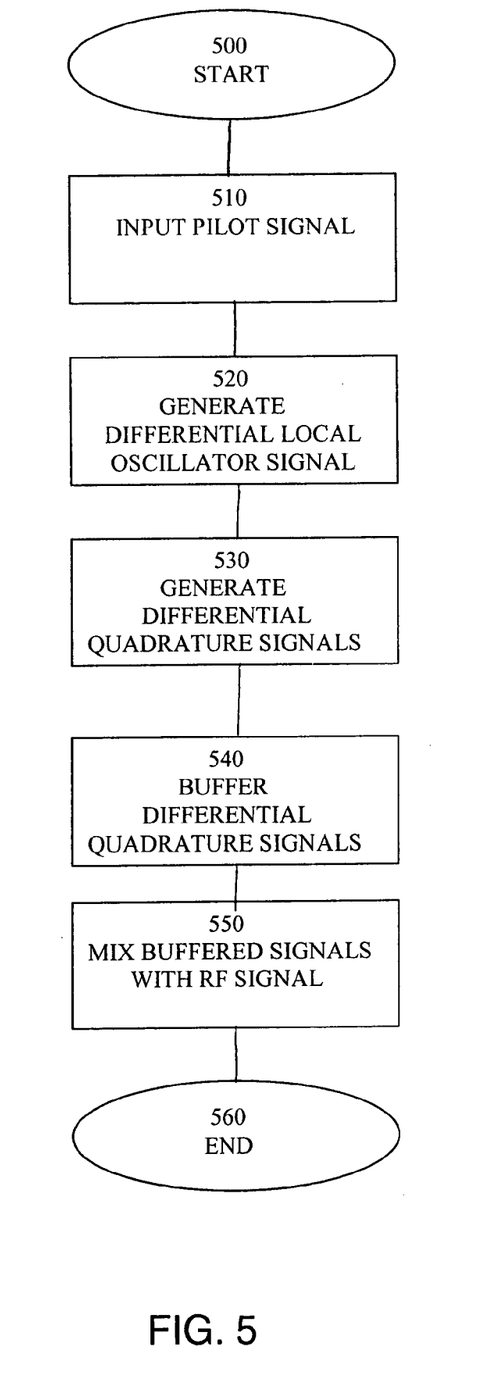
FIG. 5 shows a flowchart for frequency conversion in accordance with one exemplary aspect of the present invention.

FIG. 5 shows a flowchart of an exemplary method for frequency conversion according to the various exemplary aspects of the present invention. Beginning at step 500, control proceeds to step 510, where a pilot signal is input to a signal processor. Next, in step 520, in the pilot signal is applied to a frequency multiplier/divider of the signal processor and a differential pair of local oscillator signals is generated. In this step, the frequency of the pilot signal is converted to the desired local oscillator frequency. It should be appreciated that if the frequency of the pilot signal is already equal to that of the desired local oscillator frequency, this step may be omitted. Control then proceed to step 530.

In step 530, a differential branch-line directional coupler processes the differential pair of local oscillator signals, and generates differential quadrature local oscillator signals. That is, the coupler receives the differential pair of local oscillator signals, and splits the incoming signals into quadrature versions. Next, in step 540, the differential quadrature local oscillator signals are buffered. In this step, buffers are provided to present the correct value of resistive termination to the coupler. It should be appreciated that if the coupler is already provided with the correct value of resistive termination, this step may be omitted. Then, in step 550, the buffered differential quadrature signals are then mixed in a quadrature mixer with a radio frequency signal.

Control then proceed to step 560 where the process ends.

Exemplary Application

The following description is an exemplary application of the various aspects of the present invention.

In this exemplary application, the frequency conversion system is a 59-64 GHz direct-conversion downconverting receiver. The radio frequency signal applied to the amplifier is at 59-64 GHz.

In this exemplary application, in the branch-line directional coupler, the bottom of the top level of metal is approximately 11 μm above the ground plane on the first level of metal, and the effective dielectric constant of the insulating layers is approximately 4. The quarter-wavelength transmission lines at 59-64 GHz are approximately 600 μm long. A single microstrip transmission line 10 μm wide on the top level of metal has a characteristic impedance of 52 ohms. Two coupled transmission lines 10 μm wide and spaced 20 μm apart have a characteristic impedance of 45 ohms, and if the spacing is reduced to 10 μm, the impedance is 38 ohms. Thus, the coupling between the two differential halves of the differential branch-line coupler is significant at typical integrated circuit wire spacings and becomes an additional design variable.

In accordance with this exemplary application, the frequency multiplier/divider is a frequency tripler that produces a 59-64 GHz differential local oscillator signal from an off-chip 19.67-21.33 GHz pilot signal. That is, the pilot signals are at a frequency exactly one-third of the desired local-oscillator signals, and the tripler amplifies the pilot signals by tripling the frequency of the pilot signals to the desired local oscillator frequency. Thus, the differential local oscillator output of the frequency tripler is applied to the coupler at 59-64 GHz.

As discussed above, it should be appreciated that the frequency tripler may be omitted if the pilot frequency is the same as the local oscillator frequency.

The differential branch-line directional coupler in this exemplary application was designed to have an effective characteristic impedance of 65 ohms, a center frequency of 60 GHz, and 20 μm spacing between the transmission lines making up the two differential halves of the coupler.

Figure 6:
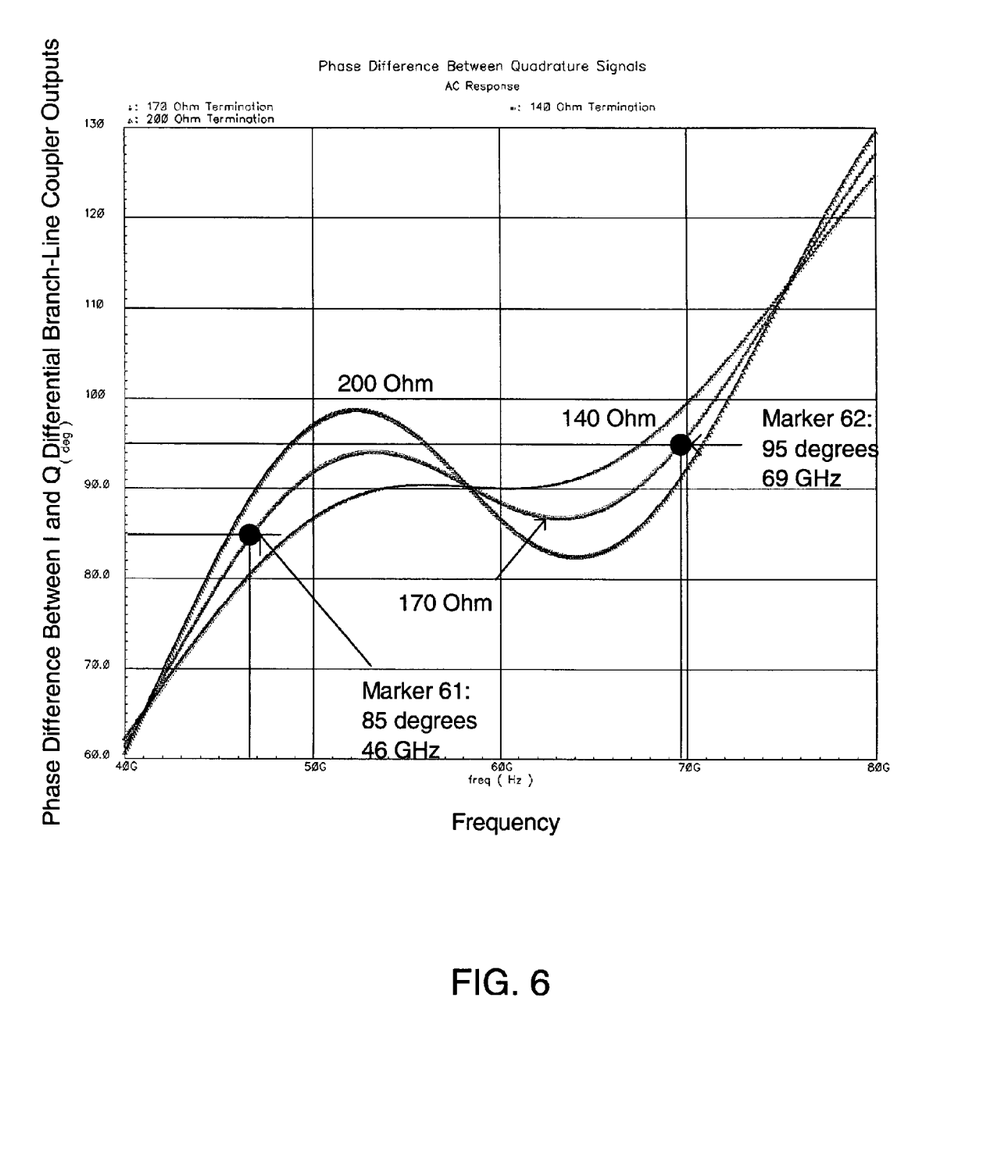
FIG. 6 shows a graphical presentation of exemplary simulations performed on a frequency conversion system embodying the exemplary aspects of the present invention.

For this exemplary application, circuit simulations were performed on the direct-conversion downconverting receiver, including the differential branch-line directional coupler. FIG. 6 shows a graphical presentation of exemplary simulations performed on a frequency conversion system embodying the exemplary aspects of the present invention, giving the phase difference between the I-Phase and Q-Phase differential branch-line directional coupler outputs as a function of frequency.

The exemplary simulations of FIG. 6 were run for various values of termination resistors 140 ohms, 170 ohms and 200 ohms, showing that the performance of the differential branch-line directional coupler is sensitive to termination impedance. As illustrated in FIG. 6, though the differential branch-line directional coupler would normally be differentially terminated with resistive loads twice the coupler's effective characteristic impedance to give an output phase difference of 90° at the center design frequency, since output phase differences in the range of 85° to 95° were tolerable, the coupler may be differentially terminated with 170 ohm loads instead of 130 ohms in order to increase its usable bandwidth. That is, as shown in FIG. 6, with 170 ohm loads, the usable bandwidth shown between markers 61 and 62 is approximately 46 to 69 GHz for output phase differences in the range of 85° to 95°. Thus, for a 170 ohm termination resistor, the output phase difference is 85° at 46 GHz (marker 61) and 95° at 69 GHz (marker 62), and therefore, between 46 to 69 GHz, the output phase difference is between 85° to 95°, as desired.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A frequency conversion system for providing millimeter-wave frequency quadrature signals, comprising:
    an amplifier that generates a radio frequency signal;
    a signal processor comprising a differential branch-line directional coupler that inputs a pilot signal and outputs quadrature differential signals; and
    a quadrature mixer that mixes the radio frequency signal and the quadrature differential signals, wherein the coupler comprises a plurality of rings and a plurality of underpasses connecting ports of the rings.

2. The frequency conversion system of claim 1, wherein the signal processor is implemented entirely on-chip.

3. The frequency conversion system of claim 1, wherein each of the plurality of rings comprises a plurality of branch lines of varying length and characteristic impedance, and an underpass.

4. The frequency conversion system of claim 1, wherein each of the plurality of rings comprises four branch lines, each branch line having an electrical length of one-quarter wavelength at center design frequency.

5. The frequency conversion system of claim 1, wherein each of the plurality of rings comprises a plurality of branch lines and wherein coupling between the plurality of branch lines of the rings is varied.

6. A signal processor, comprising:
    an input terminal that inputs a pilot signal;
    a differential branch-line directional coupler that receives the pilot signal and generates quadrature differential signals; and
    output terminals that output the quadrature differential signals, wherein the coupler comprises a plurality of rings and a plurality of underpasses connecting ports of the rings.

7. The signal processor of claim 6, wherein the signal processor is implemented entirely on-chip.

8. The signal processor of claim 6, wherein each of the plurality of rings comprises a plurality of branch lines of varying length and characteristic impedance, and an underpass.

9. The signal processor of claim 6, wherein each of the plurality of rings comprises four branch lines, each branch line having an electrical length of one-quarter wavelength at center design frequency.

10. The signal processor of claim 6, wherein each of the plurality of rings comprises a plurality of branch lines and wherein coupling between the plurality of branch lines of the rings is varied.

11. The signal processor of claim 6, further comprising a terminating resistor connected to the output terminals.

* * * * *